United States Patent [19]

Rhoades

[11] Patent Number: 5,225,038
[45] Date of Patent: Jul. 6, 1993

[54] ORBITAL CHEMICAL MILLING

[75] Inventor: Lawrence J. Rhoades, Pittsburgh, Pa.

[73] Assignee: Extrude Hone Corporation, Irwin, Pa.

[21] Appl. No.: 792,620

[22] Filed: Nov. 15, 1991

Related U.S. Application Data

[63] Continuation-in-part of Ser. No. 564,604, Aug. 9, 1990, Pat. No. 5,114,548.

[51] Int. Cl.[5] .............................................. C23F 1/04
[52] U.S. Cl. ................................. 156/645; 156/661.1
[58] Field of Search ........................... 156/645, 661.1; 204/129.46

[56] References Cited

U.S. PATENT DOCUMENTS

| | | | |
|---|---|---|---|
| 2,933,437 | 4/1960 | Loosme | 156/645 X |
| 3,547,796 | 12/1970 | Randall | 204/129.46 X |
| 4,070,752 | 1/1978 | Robinson | 156/645 X |
| 4,113,549 | 9/1978 | Brimm | 156/661.1 X |
| 4,215,194 | 7/1980 | Shepherd | 156/645 X |
| 4,585,519 | 4/1986 | Jaffe et al. | 156/645 |

*Primary Examiner*—Donald R. Valentine
*Attorney, Agent, or Firm*—Waldron & Associates

[57] ABSTRACT

A method for chemical milling a workpiece utilizing a chemical milling fluid that is passivating to the workpiece, wherein the tool is provided with an abrasive surface, and said tool and workpiece are brought together with a contacting relative motion so that said abrasive surface will selectively abrade the workpiece to remove any passivation layer therefrom in those areas to be machined and such that the unabraded surface areas will retain the passivation layer to prevent chemical milling thereof, and a reciprocal motion between the tool and workpiece is also effected to pump the chemical milling fluid through the gap between the tool and workpiece and prevent reduction of the milling rate of the milling fluid.

40 Claims, 4 Drawing Sheets

ORBITAL CHEMICAL MILLING

BACKGROUND OF THE INVENTION

Cross Reference to a Related Application

This is a continuation-in-part application of pending application Ser. No. 07/564,604, of Lawrence J. Rhoades, filed on Aug. 9, 1990, now U.S. Pat. No. 5,114,548.

Field of the Invention

This invention relates generally to a new and unique chemical milling process, and more specifically to a unique machining process which has greatly improved shaping capabilities over comparable prior art techniques by including a relative contacting movement, orbital or otherwise, between the tool and workpiece in one plane, and further effecting a reciprocating motion as a result of the orbital motion or by a separate reciprocal motion in a second plane. This new and inventive process greatly expands the capabilities of chemical milling to make possible the machining of complex external or internal shapes with a high degree of accuracy and precision not obtainable by prior art chemical milling practices. Of particular significance is the fact that the process of this invention provides a relatively simple method of machining such complex shapes as turbine blades with a high degree of accuracy, either individually, or even a whole circular array of turbine blades on a complex turbine wheel simultaneously.

The Prior Art

Chemical milling is one of the non-traditional machining processes, which is in essence an application of a chemical reaction in a machining process to selectively and controllably remove metal from a workpiece. Chemical milling is ideally suited to the machining of metals which are difficult to machine by the more traditional machining processes, and does not induce any residual stresses or distortion in the machined workpiece. Even heat treated and work hardened metals can be machined by chemical milling without any adverse effects on the metal's premachining properties.

Unlike conventional machining, chemical milling has no tool to contact the workpiece, and accordingly, removes metal from a workpiece chemically atom by atom with virtually no tool wear.

At the same time, the reaction products formed between the milling fluid and the workpiece are often left deposited on the surface of the workpiece. Such deposits form a film of "passivated" material which impede or block the chemical milling reaction.

It is usual to adopt conditions and chemical milling fluids which minimize the formation of a passivation layer on the workpiece to avoid the delays involved by the reduced machining rate which results. When excessive passivation occurs, it must be removed fro the milling operation to continue.

The usual adaptations tend, as a general rule, to require a less-than-maximum machining rate as the necessary expedient to avoid excessive or unmanageable passivation.

In such systems, the chemical milling procedure employs masking to protect areas where milling action is not desired, making appropriate allowances for undercutting of the edges of the mask.

In one variation on the general theme, Taylor; U.S. Pat. No. 3,593,410, employs a chemical solution to react with the surface of a die member to form a reaction product to a depth of a few ten-thousandths of an inch on the surface. The reaction product is then ground away by vibrational relative motion between the surface and an abrasive coated matching member to "spot" the die surface. In the Taylor procedure, the die must be formed in very close conformity to the required shape before the "spotting" procedure is employed; Taylor does not contemplate a milling procedure to achieve the required shape and dimensions.

SUMMARY OF THE INVENTION

This invention is predicated on the development of a new and unique method of chemical milling which has the capability of machining complex two and three dimensional configurations with a high degree of accuracy, precision, and resolution of intricate detail. In this unique new chemical milling process, the tool is similar to the tool used in orbital grinding, in that it has a body with abrasive particles at the surface such that the particles will abrade surfaces of the workpiece. In this process, the tool is not a rotating tool, and can therefore have any surface configuration desired to be machined into the workpiece, including three dimensional configurations. In the new chemical milling process of this invention, the tool and workpiece are brought together under chemical milling processing conditions with relative motion between the two components, while at the same time, the surface areas of contact reciprocate through a cycle whereby they are in contacting motion for a moment of time, then move away from each other and then back into contacting motion to essentially "pump" the chemical milling fluid through the interfaces. Depending upon the geometry of the interfaces, the relative motion alone can effect the reciprocating pumping action, or if needed, a second relative motion in a different plane can be imposed to effect the reciprocating relative motion. While the contacting motion will normally be a circular orbital motion, it can be any two dimensional reciprocating movement describable by a point on the moving component moving in a closed trajectory line in a plane transverse to that of the feed axis, and may define many forms such as circular, oval, elliptical, polygonal, and other forms, including combinations thereof, as may be essential to achieve the machining desired. The reciprocating relative motion between the contacting interfaces will cause spent chemical milling fluid to be purged from the interface while drawing in fresh chemical milling fluid with each cycle of reciprocation motion. As in more conventional applications, the tool and/or workpiece may have to be made to progressively advance one toward the other at a feed rate in proportion to the metal removal rate to maintain a preferred gap spacing between the tool and workpiece as the metal is being removed.

The chemical milling fluid used in this inventive process will be passivating and may be very strongly passivating to the workpiece, which serves to provide both a macro and micro controllability to the inventive process, as described herein below.

The tool utilized in this inventive process must be provided with abrasive particles extending from a body portion. During the process, the abrasive particles extending from the tool surface must be in contact against the surface of the workpiece sufficient only to lightly abrade the workpiece surface in a manner akin to orbital machining, but serving only to abrade away the passivation layer. At the same time, and/or a brief period, as brief as a fraction of a second thereafter, the chemical milling fluid will chemically mill the workpiece surface until passivation again occurs. Unlike conventional grinding, the physical abrasion caused by the orbital action between the tool and workpiece in this invention does not significantly contribute to the machining of the workpiece, but is sufficient only to abrade away the passivation layer, as above noted. This rather limited abrasive action will, however, provide numerous unexpected advantages which will add a considerable measure of control to the chemical milling metal removing action, and enhance the capabilities of the process to greatly improve precision and resolution of detail.

In accordance with the basic application of this invention, the machining is achieved almost entirely by the chemical milling action. The chemical milling fluid and operating parameters are normally selected so that the fluid is very strongly passivating to the workpiece, particularly at the finish of the machining operation to achieve a greater degree of precision. The orbital abrading action of the tool surface serves merely to lightly abrade the surface of the workpiece, sufficient only to remove or prevent the formation of the passivation layer in those selected areas where the tool abrades the workpiece. The passivating nature of the chemical milling fluid serves not only to prevent the chemical milling action on those surfaces where the tool, by design, does not abrade away the passivation layer, but further serves, in combination with proper tool design and motion thereof, to control the metal removal on those surfaces where the tool does remove the passivation layer. Accordingly, the chemical milling machining will progress only on those areas where the tool has removed, or prevented the formation of, the passivation layer, and then only to the extent as determined by the tool design and motion thereof. The tool geometry, nature of the abrasive surface thereon and its motion relative to the workpiece, can be utilized to very carefully define those areas where the chemical milling machining is to be effected and the degree of chemical milling machining on those various surfaces, to thereby control and regulate the overall chemical milling process to a far greater degree than had been capable by prior art practices.

In addition to the above advantages of this invention, numerous other unexpected advantages are afforded by this inventive process. For example, the process of this invention will tend to significantly minimize overcut because only those surfaces abraded by the tool will be chemical milling machined. In addition, because there is no need to adjust conditions for preventing passivation, there is a wider choice of chemical milling fluids and accordingly fluids can be used which will minimize stray etching. Still another beneficial factor is that the process of this invention can be performed at high metal removal. Stray etching and undercutting are prevented from occurring in the process of this invention by an intentionally formed passivation layer, so that very sharp external corners can be formed even at high metal removal rates. It is difficult to machine sharp external corners by conventional chemical milling, as stray etching will erode at least a portion of the workpiece surface around the corner from the surface to be milled, thereby tending to "round" the corner. Sharp external corners can readily be machined by the process of this invention, however, by utilizing proper tool design which will permit quick passivation on one surface while machining an adjacent surface to effect a sharp corner as desired. In view of these and other considerations, this new and unique process for chemical milling machining will provide a significantly greater degree of control of the overall machining action to produce a much greater degree of accuracy and precision in both simple and complex surfaces and images than has been possible with any prior art chemical milling machining process.

In addition to the above considerations, the process of this invention finds particular utility in the machining of very complex forms such as turbine blades and the like, not only individually, but also in groups, including the simultaneous machining of all turbine blades on a turbine wheel.

While most of the earlier turbine wheels were manufactured of many component parts, with each turbine blade individually keyed to the turbine wheel, more recent developments have been addressed to reducing the weight of the turbine wheel by designing the wheel with the turbine blades thereon in one part to eliminate the excess weight necessitated by the mass of metal needed to effect the key-in attachments. While this approach has proven very effective in reducing the weight of turbine wheels and greatly increasing their efficiency, the machining of such one-piece turbine wheels has proven to be extremely difficult. The unique process of this invention, as noted above, will permit a relatively simple method of machining such turbine wheels to a very high degree of accuracy, in a relatively short time at a significant cost savings.

OBJECTS OF THE INVENTION

Accordingly, it is an object of this invention to provide a new and improved method for chemical milling machining which will provide a significantly greater degree of control of the machining action to effect a greater degree of accuracy and precision in both simple and complex surface and images than has been possible with prior art chemical milling machining processes.

It is another object of this invention to provide a new and improved method for chemical milling machining that utilizes a strongly passivating fluid and incorporates a light oscillating or orbital abrading action by the tool to selectively and controllably remove the passivation layer and thereby selectively control the chemical milling machining action.

It is a further object of this invention to provide a new and improved method for chemical milling machining which utilizes a reciprocal motion between the tool and workpiece to pump and enhance the circulation of the chemical milling fluid through the interface to thereby permit the use of higher removal rates and to improve the quality of the finished product.

It is still another object of this invention to provide a new and improved method for chemical milling machining which permits a wider selection of chemical milling fluids and thus permits the use of those chemical milling fluids that will minimize stray etching.

It is an even further object of this invention to provide a new and improved method for chemical milling machining which eliminates or minimizes overcutting.

It is another object of this invention to provide a process machining complex shapes such as turbine blades, either individually or in groups, including the simultaneous machining of all turbine blades on a one piece turbine wheel.

DETAILED DESCRIPTION OF THE INVENTION

Throughout the description of the invention, the term "relative" contacting motion or "relative" orbital motion or movement between the contacting surfaces of the workpiece and tool is used to indicate that either or both the workpiece and tool may be in motion to effect a working of the workpiece, with the tool lightly abrading the surface of the workpiece. The actual relative contacting motion at the interface between the workpiece and tool and may or may not be orbital, depending on the geometry of the workpiece surface. In addition to the essential "relative" contacting motion, there must also be a relative reciprocating motion where at least portions of the contacting interfaces between the tool and workpiece oscillation to move into contact and away from contact, for purposes of pumping the chemical milling fluid. Here again relative reciprocating motion is meant to indicate that either or both the workpiece and tool may be in motion to effect a resultant reciprocating movement which may be a specific reciprocating movement in addition to the relative contacting motion in a different plane, or it may be a natural resultant reciprocating motion at the contacting interface created by a relative contacting orbital motion.

In addition to the above noted motion or motions, whether effected by a single contacting orbital motion or the combination of a contacting relative motion and a reciprocating motion, a feeding or advancing motion may have to be included for the purpose of maintaining the desired contacting interfaces as the surface of the workpiece is machined away by the chemical milling reaction. If the tool only works one surface of the workpiece, this "advancing" motion will have to be a linear motion whereby the workpiece and tool are slowly brought together so that each orbital contact between the tool and workpiece will be uniform despite the fact that the workpiece surface is being machined away. If the tool orbits around an exterior or interior surface of the workpiece machining the circumference thereof, the "advancing" motion will have to be represented by a slow change in the radius of orbit to maintain the constant contact between tool and workpiece as the circumference of the workpiece is machined away.

Figure 1:
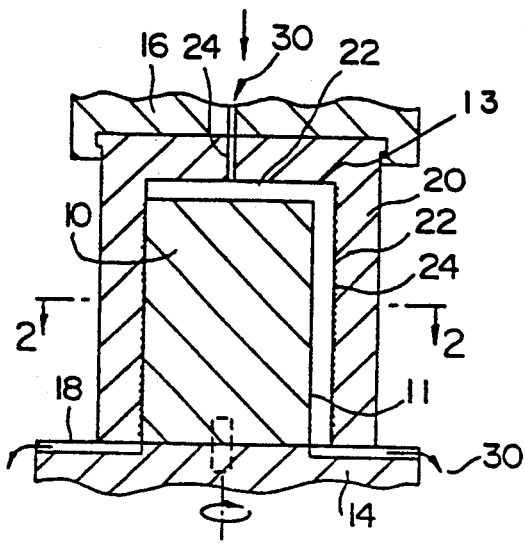
FIG. 1 is a schematic cross-sectional elevational view illustrating a very simple embodiment of this invention utilizing only a simple orbital relative motion to machine a simple cylindrical workpiece.
Figure 2:
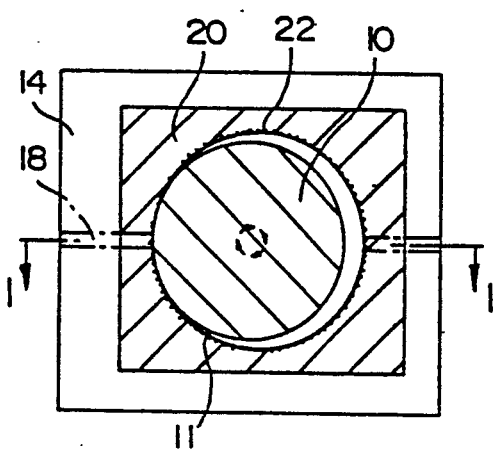
FIG. 2 is a schematic cross-sectional plan view of the embodiment illustrated in FIG. 1.

Reference to FIGS. 1 and 2 will illustrate a very simple embodiment of this invention which, in addition to a feeding motion, utilizes only an orbital contacting motion between the workpiece and tool. In this application, FIG. 1 shows a schematic cross-sectional elevation illustrating a cylindrical workpiece (10) and tool (20) as engaged during the machining operation, while FIG. 2 shows a schematic cross-sectional plan view of the embodiment shown in FIG. 1. In the embodiment illustrated, the metal workpiece (10), having a cylindrical surface configuration to be machined, is secured onto an orbital table (14), with the axis of cylindrical workpiece (10) vertically disposed, and which moves the workpiece (10) in a circular, orbitally oscillating relationship with the motion being limited to the horizontal plane. It should be appreciated that the relative motion is orbital and not rotational.

Tool (20), secured to platten (16), should be fabricated, having a cylindrical opening (22) therethrough, the walls of which serve as the working surface. The cylindrical working surface of opening (22) is provided with a uniform layer of an abrasive particles (24) bonded to the tool. Techniques for bonding the abrasive particles to the tool body are well known and need not be detailed here. The particle size of the abrasive (24) on the cylindrical surface of tool (20) should be relatively small; i.e., smaller than about 70 mesh, and ideally about 320 mesh. The surface density of the abrasive grit (22) should be reasonably high to assure that the passivation layer is completely removed during the short period of contact between the tool and workpiece.

During the processing, the relative orbital contacting motion as described, must be sufficient to cause the workpiece (10) to orbit about within tool (20), or vice versa, such that the abrasive particles (24) will lightly abrade the cylindrical surface (11) of workpiece (10) with the area of contact continually changing; i.e., moving radially around both cylindrical surfaces (11) and (22). Specifically, at any given point in time, the area of contact will be a line, or very narrow band extending the full height of cylindrical surface (11) where the working face (22) is tangent thereto, as depicted at the left side of workpiece (10) in FIGS. 1 and 2. As the orbit progresses, the line or band of contact will revolve around surface (11), so that one full orbital revolution will cause the entire cylindrical surface (11) to be contacted by surface (22), and accordingly abraded.

During the processing, a suitable chemical milling fluid (30) is admitted into the chamber between workpiece (10) and tool (20) via inlets (24), so that the chemical milling fluid will move downwardly through the chamber and exit through the gap between tool (20) and orbital table (14), where it is recovered and reprocessed by any suitable means (not shown). Such chemical milling fluid processing and recirculation systems are well known in the prior art and need not be further described here. As shown in FIGS. 1 and 2, channels (18) can be provided within the upper surface of table (14) to facilitate the flow of chemical milling fluid from between the workpiece (10) and tool (20).

The chemical milling fluid (30), as noted, may be strongly passivating to the workpiece, so that the workpiece surfaces are quickly passivated to prevent and chemical milling machining thereof, were it not for the mechanical abrading action which prevents the build-up of any passivation layer. As the abrasive particles abrade away a thin surface layer, including any formed oxides, to expose fresh non-oxidized workpiece metal, as a result of the motion of the contacting interface, the chemical milling reaction will cause metal to be removed at that site. The continued relative motion will cause the abrasive particles to move away from the freshly abraded surface, so that the chemical milling machining thereof will continue. This action will progress around the cylindrical surface of workpiece (10) behind the constantly moving area of direct contact. In view of the fact that a flow of the chemical milling fluid is caused by virtue of its being directed downwardly through the chamber between workpiece (10) and tool (20), the chemical milling fluid is caused to flow through the gap between the tool and workpiece pursuant to conventional chemical milling practices. One of the unique features of this invention, however, is the fact that the workpiece and tool are caused to have a relative reciprocal motion so that the chemical milling fluid is further caused to be effectively "pumped" through the contacting gap between the tool and workpiece. It should be apparent therefore, that because of this added pumping action, there will be no pockets of chemical milling fluid which can be trapped between the workpiece and tool surfaces which can adversely affect the processing. As a result, significantly higher metal removal rates can be utilized in the chemical milling processing, which will provide a smoother and more uniform finish to the chemical milling machined surface.

In the above described embodiment, it should be noted that the flat upper surface (13) on workpiece (10) is not contacted or abraded by tool (20). Accordingly, this flat surface (13) will be very quickly passivated by chemical milling fluid (30) so that virtually no portion thereof will be machined by either physical abrasion or the chemical milling reaction. As previously described, only the intersecting cylindrical surface (11) is machined, and because of this machining of just the one intersecting surface, a very sharp intersecting right angle will be maintained between surfaces (11) and (13). Indeed, metal removal rates can be employed without any tendency for the chemical milling reaction to "round" or bevel away the sharp corner. While this is a rather simple example of this particular beneficial feature of this invention, it does serve to illustrate an example of the macro controls available with this process. Specifically, without passivation of surface (13), this surface would be machined to some extent by the chemical milling reaction. This is because some metal removal would result from stray etching caused by chemical milling fluid passing between the cylindrical surface (22) of tool (20), and the flat upper surface (13) on workpiece (10), which would be manifested by a rounding of the angle of intersection between surfaces (11) and (13).

The parameters for the contacting orbital motion should ideally be the same as that used in orbital grinding. The gap between the body of tool (20) and workpiece (10) at their point of closest proximity will of course be equal to that distance the abrasive particles space the two components apart, and should be set to be the distance preferred for optimum chemical milling machineability. The maximum spacing between the tool (20) and workpiece (10) at their furthest apart position will be no more that the diameter of the orbit; i.e., typically no more than about 0.2 inch. As shown in FIGS. 1 and 2, however, that gap distance is exaggerated to facilitate an understanding of the figures.

Since the desired machining of the cylindrical surface of workpiece (10) will progressively reduce the radius thereof, the radius of the relative contacting orbital motion will have to be continuously increasing in order to effect an advancing motion so that the physical contact between the tool and workpiece will be maintained. The ability to effect this progressively increasing radius of orbit is available with appropriate commercial machine tool orbital tables through rather complicated linkage, which need not be described here. It is also within the skill of the art to be able to accurately calculate the machining rate and then preset the orbital table so that the radius of orbit will progressively increase as necessary to maintain the desired contact pressure between the tool and workpiece throughout the machining operation. The advance speed (rate) may be controlled as a function of the feedback of the contact force between the tool and the workpiece. As an alternative, and particularly towards the end of the machining action, it may be desirable in some situations to permit the contacting force between the tool and workpiece to be progressively increased so that the final machining action is limited primarily to a physical abrasion for the purpose of achieving a more precision finish.

In the above described embodiment, it can be seen that the relative contacting orbital motion will cause the tool to abrade the passivation layer from the surface of the workpiece, or prevent the formation of a passivation layer so that the surface can be machined by the chemical milling reaction between the fluid and workpiece immediately thereafter. During this entire operation, the tool is moving towards and then away from the workpiece, to effectively pump the chemical milling fluid through the gap to provide fresh chemical milling fluid. In this particular application the single contacting orbital motion will effect both requirements. Any curved surface such as cylindrical, hemispherical and the like can usually be machined by such a technique whereby a simple contacting orbital motion will effect both the desired machining operation as well as the chemical milling fluid pumping action.

Figure 3:
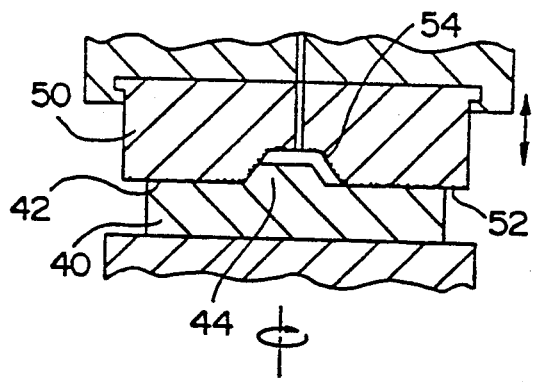
FIG. 3 is a schematic cross-sectional elevational view illustrating another very simple embodiment of this invention utilizing a combination of an orbital relative motion and a reciprocal relative motion to machine a flat surface on a workpiece, showing the tool and workpiece in contact.
Figure 4:
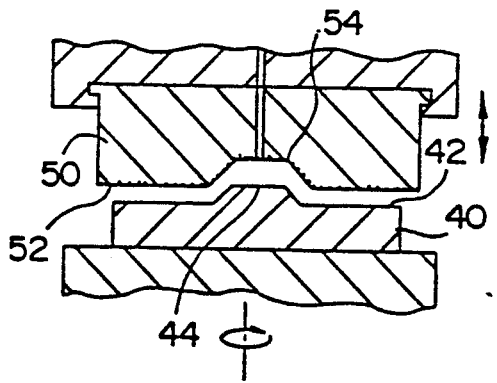
FIG. 4 is identical to FIG. 3 except that it shows the tool and workpiece in a non-contacting relationship.

Reference to FIGS. 3 and 4 will illustrate a rather different embodiment of this invention as may be utilized to abrade flat workpiece surfaces. In the case of such flat workpiece surfaces, a simple contacting orbital motion in the plane of the workpiece surface will not be sufficient to effect a reciprocating motion between the tool and workpiece as necessary to pump the through the interface gap. In such an application, therefore, it will be necessary to impose a relative reciprocal motion as well as a contacting orbital motion.

As shown in FIGS. 3 and 4, a workpiece (40), having an annular-shaped upper surface (42) with a frusto-conical portion (44) extending upward from the center, is machined by tool (50). Tool (50) has a flat bottom surface (52) with a frusto-conical recess (54) therein for mating with frusto-conical portion (44). The flat bottom surface (52), as well as the surface within frusto-conical recess (54) are both covered with an abrasive grit, as previously described. The workpiece (40) and tool (50) are attached to an orbital table and plate respectively, as previously described, and placed in a relative contacting orbital motion as also previously described. In addition to the relative contacting orbital motion, a relative reciprocal motion is also effected between workpiece (40) and tool (50) so that these two components repeatedly move together and touch for a period of time sufficient to lightly abrade the workpiece surface, and then move away from each other. Accordingly, FIG. 3 illustrates that relative position during the cycle where the workpiece and tool are in contact, while FIG. 4 illustrates the relative position when the two components are at their maximum separated position.

As the abrasive grit on surface (52) comes into contact with surface (42) of workpiece (40), as shown in FIG. 3, it should be apparent that the relative contacting orbital motion at the interface will cause the abrasive grit to abrade surface (42) and remove any passivation layer therefrom, so that the chemical milling reaction will proceed to machine surface (42) immediately after the passivation layer is removed, and for a period of time while tool (50) is spaced away therefrom as a result of the relative reciprocal movement. While surface (42) will start to become passivated thereafter, any surface oxidation that occurs will again be removed when the cycle is repeated, so that the chemical milling action can continue.

As before described, it will also be necessary to impose a feed motion to the reciprocating motion, so that with each cycle of reciprocation, the tool is brought down further than before so that it will continue to contact the workpiece surface (42), as that surface is progressively machined to a lower position.

As for the surface of the frusto-conical extension (44), it will be machined in substantially the same manner as was the cylindrical wall of workpiece (10), in the previously described embodiment, with some notable distinctions. That is to say, if the surface being machined is only a flat surface, such as surface (42), the reciprocating motion cannot adversely affect its being machined as above described. It should be noted, however, that the reciprocating movement can have a very significant effect on the machining action on surfaces that are not parallel to the contacting orbital motion, such as the sides of the frusto-conical extension (44). Specifically, if the contacting orbital and reciprocal motions are synchronized in a one to one relationship, it can be seen that only one side of the frusto-conical extension (44) will be machined, since the tool (50) will move downward contacting only a portion of the frusto-conical surface at the same place with each reciprocation movement, and then withdraw therefrom as the tool orbits to the other side. With a physical arrangement like this, therefore, in order to uniformly machine an entire circumferential surface when the tool is made to reciprocate therefrom, it is necessary that the contacting orbital motion and reciprocating motion be synchronized so that all portions of surface are contacted and abraded at least over a number of reciprocating cycles. The preferred approach to achieve this assurance, is to abrade various differing portions of the curved surface during successive contacting orbits so that the entire surface will be abraded within relatively few cycles of orbit. If passivation of the frusto-conical surface causes chemical milling machining thereof to be retarded, so that the chemical milling machining rate of the flat surface (42) proceeds at a much faster rate, it may be necessary to program the motion so that each pass of the abrasive tool over frusto-conical surface will necessarily affect a greater amount of mechanical abrading.

With further regard to the frusto-conical portion (44) of workpiece (40), it can be seen that the flat upper surface thereof would not be machined, as in the case of the top of cylindrical workpiece as described earlier. In this embodiment, however, the tool is progressively working its way downward, so that eventually, if machining is continued long enough, there would be contact at the upper flat surface thereof.

In contrast to the above described embodiment as illustrated in FIGS. 1 and 2, the contacting orbital motion in this embodiment will not cause the contacting surfaces (42) and (52) to reciprocate. This is because the plane of the contacting orbital motion is parallel to the plane being machined, at least with regard to surface (42). In this embodiment, therefore, it is necessary to impose a separate relative reciprocating movement for the purpose of pumping the chemical milling fluid through the gap between surfaces (42) and (52) to prevent the chemical milling fluid from becoming overheated or over-saturated with dissolved workpiece material. It should become apparent, however, that if the plane of contacting orbital motion were not parallel to the surface being machined, but instead is inclined at an angle thereto, as depicted in FIG. 5, then the single relative contacting orbital motion would effect a reciprocating relative motion or displacement, so that the tool and workpiece would come into contact at the low point of the orbit, to effect the essential physical abrasion to remove the passivation layer, and thereafter orbit away from a contacting relationship to effectively pump the chemical milling fluid as necessary to effect its circulation.

Figure 5:
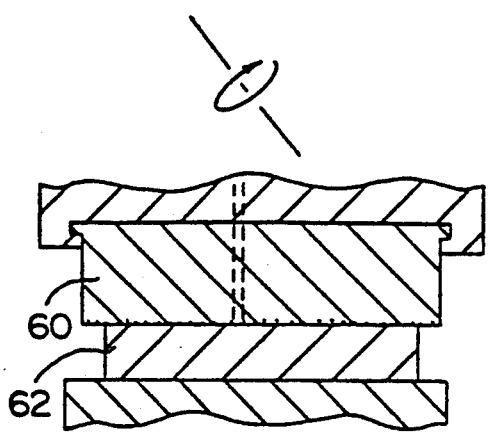
FIG. 5 is a schematic cross-sectional elevational view illustrating an embodiment of this invention for machining a flat surface utilizing an orbital motion inclined to the plane of the workpiece surface, showing the tool and workpiece in contact.
Figure 6:
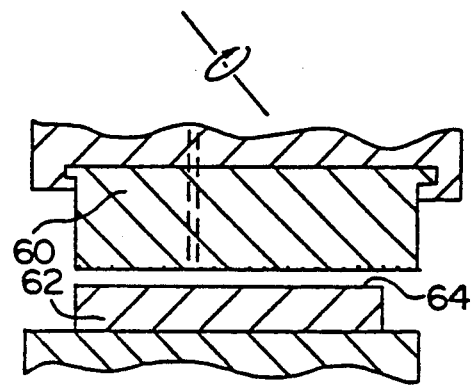
FIG. 6 is a schematic cross-sectional elevation the same as that of FIG. 5 but illustrating the tool rotated through one-half of cycle so that it is not in contact with the workpiece.

As shown in FIGS. 5 and 6, tool (60), having an axis of rotation as depicted thereabove; i.e., inclined at an angle to the surface to be machined, will come into contact with the upper surface of workpiece (62) at the furthest extent of downward-leftward orbital motion. Subsequently, as tool (60) orbits upward and to the right, it will move away from workpiece (62). Accordingly, a relative reciprocal motion will result from the contacting orbital motion. While the tool (60) will not be in contact with the workpiece (62) throughout the entire orbital motion, that makes little difference in this embodiment, as the entire surface (64) of workpiece (62) is in fact contacted and abraded by tool (60) while orbiting through its most downward position. In applications such as this, it is critically essential that the density of the abrasive grit on the tool surface be exceptionally high to assure that the entire workpiece surface is abraded during the quick pass-over by the tool.

As previously described, a means will have to be provided for feeding a chemical milling fluid into the gap between tool (60) and workpiece (62), which will readily be pumped out of the interface by the reciprocating motion between tool (60) and workpiece (62). In this embodiment it can clearly be seen that the contacting orbital motion for abrading the surface of workpiece (62) as well as the reciprocating motion for pumping the chemical milling fluid are effected by the one orbital motion. As in the case described for the embodiment of FIGS. 1 and 2, the orbital motion will have to be set to have a continually increasing radius of orbit in order to continue to maintain the essential contact as the surface of the workpiece is machined down, or in the alternative, a feeding motion can be imparted to a constant orbital motion to bring the tool and workpiece closer together as the workpiece is machined.

The above described embodiments have been limited to the machining of very simple surfaces merely for the purpose of describing the various forms of machining phenomenon that can be encountered in the practice of this invention. It should be apparent that those surfaces as described can be easily machined with other forms of conventional machining practices. Therefore, the process of this invention will find much better utility in the machining of more complex configurations which are not easily machined by other techniques. For example, the machining of an image in a coin or die or other multifaceted surfaces are one type of example where this process would find particular utility, as well as the machining of complex three-dimensional and curved surfaces such as the surfaces of turbine blades and the like which are very difficult to machine by other processes, but can easily and very effectively be machined individually or in groups or even an entire arrangement thereof on a turbine wheel by the process of this invention.

Figure 7:
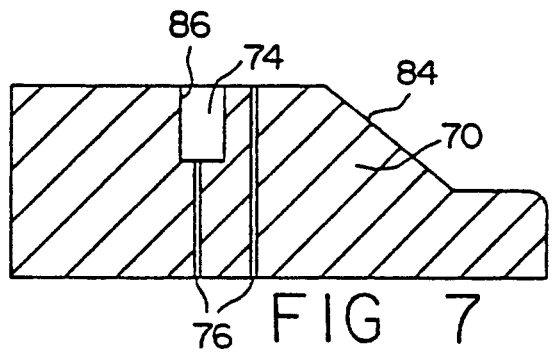
FIG. 7, is a schematic cross-sectional elevational view of a casting, on an unworked workpiece.
Figure 8:
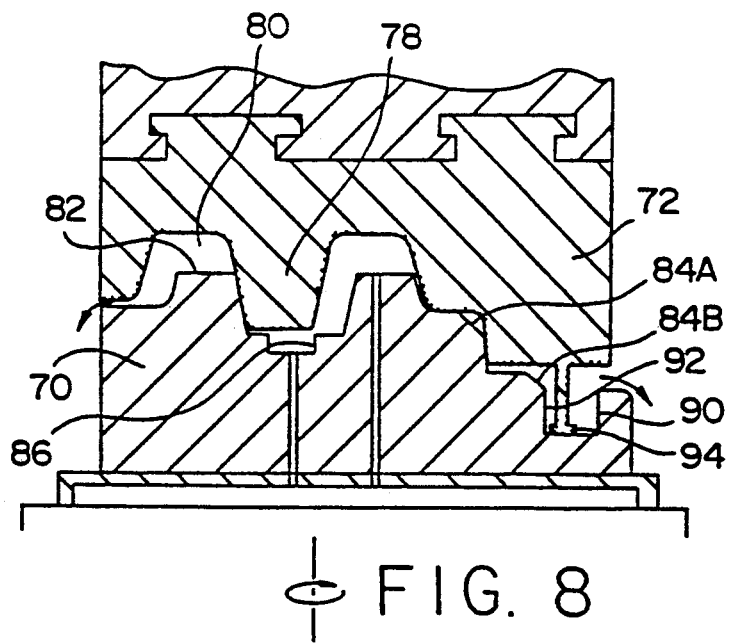
FIG. 8 is a schematic cross-sectional elevational view of the workpiece of FIG. 7 being machined in accordance with one embodiment of this invention to produce several faces therein.

Reference to FIGS. 7 and 8 will illustrate an example of the machining of a multifaceted workpiece, where FIG. 7 is a schematic cross-sectional view of the blank workpiece (70), while FIG. 8 illustrates the workpiece (70) and tool (72) in contact near the conclusion of the machining operation. As can be seen in FIG. 7, workpiece (70) has a nonuniform cross-section having a hole (74) in the upper surface. Two small narrow holes (76) are provided through the workpiece (70) for admitting the chemical milling fluid during the chemical milling machining.

FIG. 8 schematically illustrates the machining of workpiece (70) in accordance with this invention, where tool (72) is made to orbitally contact the upper surface of workpiece (70) during the chemical milling machining process. In this embodiment, the axis of orbital rotation is perpendicular to the upper flat surface of the workpiece, so that there will be no reciprocal vertical displacement as a result of the contacting orbital motion. As can be seen in FIG. 8, a frusto-conical stem portion (78) on tool (70), extending vertically downward, will serve to machine out hole (74) providing it with a tapered side interior surface, at least to the extent machined. An annular space (80), surrounding stem (78) will serve to form an annular neck around hole (74). The upper flat surface (82) around hole (74), as well as the inclined surface (84) at points (84a) and (84b), will not be machined as they are not contacted by tool (72), and will therefore be passivated by the chemical milling fluid to be unaffected by the chemical milling reaction. To the extent that there are flat horizontal surfaces being machined in this application, it will be necessary to impose a relative reciprocal motion between workpiece (70) and tool (72) for the purpose of pumping chemical milling fluid through any such horizontal interfaces, as previously described. As can be seen from this embodiment, the process can be used to machine a plurality of differing surfaces by utilizing a three-dimensional tool which is a negative complimentary image of the workpiece surfaces to be effected by the machining operation. The negative image imposed into the tool will have to be slightly undersized and oversized to compensate for the orbital displacement as the orbital path of the tool image will define the image machined.

In the process of this invention the workpiece is passivated until such time as it is abraded by the tool surface, the process variables are significantly reduced so that the image created in the tool face, as corrected for its contacting orbital motion, is essentially the same as that machined into the workpiece, with little if any requirement for any trial and error testing. As an example thereof in the above described embodiment, those surfaces (82) and (84a) and (84b), remaining untouched by the tool (72), will not at all be affected by the chemical milling reaction because of the macro controls afforded by this process. In conventional chemical milling processing, however, these surfaces would have some metal removed therefrom by the chemical milling reaction. For example, the cylindrical surface of hole (74) will be completely unaffected by this process, while in conventional chemical milling, at least the upper portions thereof would have some metal removed therefrom as the result of stray etching between that upper cylindrical surface (86) of hole (74).

Another of the unique advantages of this invention is illustrated with reference to the machining of hole (90); i.e., surface (92). As is apparent from FIG. 1, hole (90) is entirely formed by the machining action of flange (94) on tool (72). As the hole depth is machined downward by the lower face of flange (94), the side of the hole; i.e., surface (92) is suitably machined and dressed by the side surfaces of flange (94) for a short time only. Once the flange (94) has progressed below any given point on the cylindrical side surface of hole (90) it has just formed, the abrasive action of flange (94) of course ceases, and that portion of surface (92) is quickly passivated by the chemical milling fluid thereby preventing further machining. The passivation layer on surface (92) will prevent any metal removal therefrom, thus preventing any overcutting as is otherwise common in conventional chemical milling.

Figure 9A:
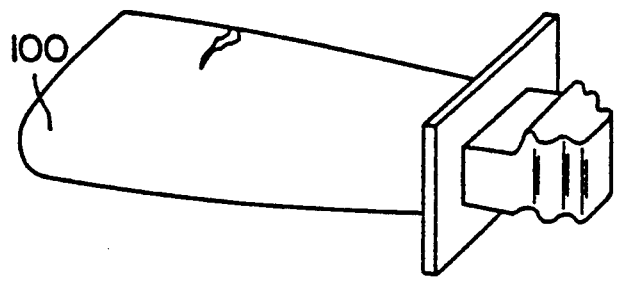
FIGS. 9a, 9b, and 9c are isometric views of a turbine blade showing three stages in the process of repairing a crack therein.
Figure 9B:
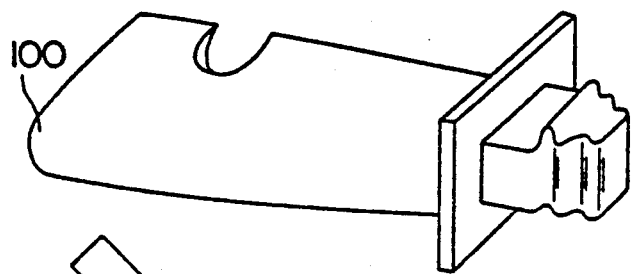
Figure 9C:
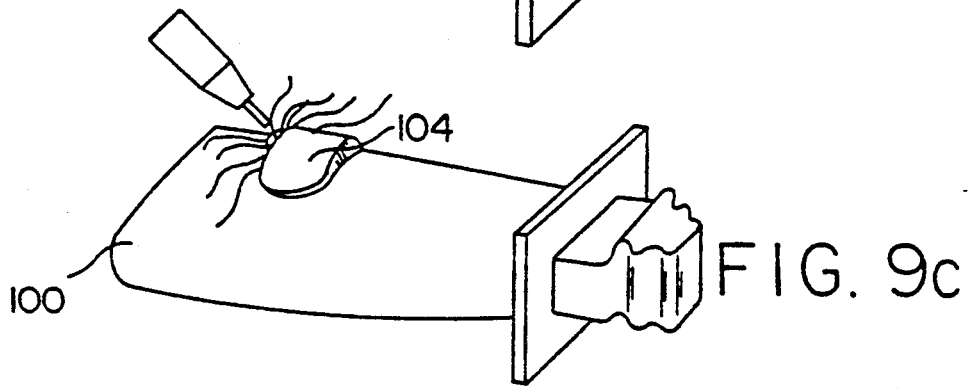

Reference to FIGS. 9a, 9b, 9c, and 10 will illustrate still another embodiment of this invention which is utilized to machine a repaired metal part, such as a turbine blade as illustrated. For example, turbine blades having flaws therein, such as holes or cracks can be easily repaired by cutting out the flaw and depositing new metal in the cut-out area. This procedure is illustrated in FIGS. 9a, 9b, and 9c. Here a crack in the turbine blade (100), as shown in FIG. 9a, is cut out by any suitable means, typically by electrical discharge machining or grinding. This renders the turbine blade with a cut-out as shown in FIG. 9b. Thereafter, new metal is deposited into the cut out portion by "dabber welding". To assure that the fill metal is as high as will be necessary for properly machining the turbine blade, it will of course be necessary to overfill the cut out as shown in FIG. 9c. Finally, the new metal should be machined down to recreate the original contour. Pursuant to prior art practices, this machining step is where the difficulty arose. For example, the contour sought to be machined in this particular application is not flat or circular, so that conventional machining could not be utilized. Conventional chemical milling would not have been appropriate because material removal would occur on all portions of the turbine blade surface, so that the original contour could not be restored.

Figure 10:
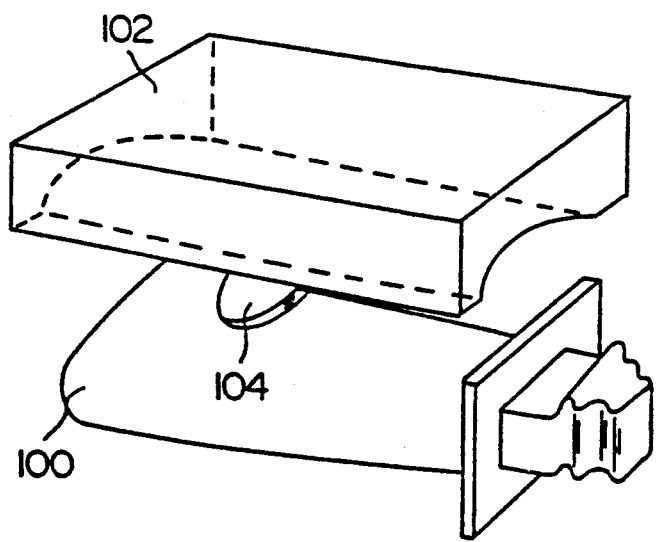
FIG. 10 is a schematic isometric view illustrating the application of the process of this invention in finishing the turbine blade illustrated in FIG. 9c.
Figure 11:
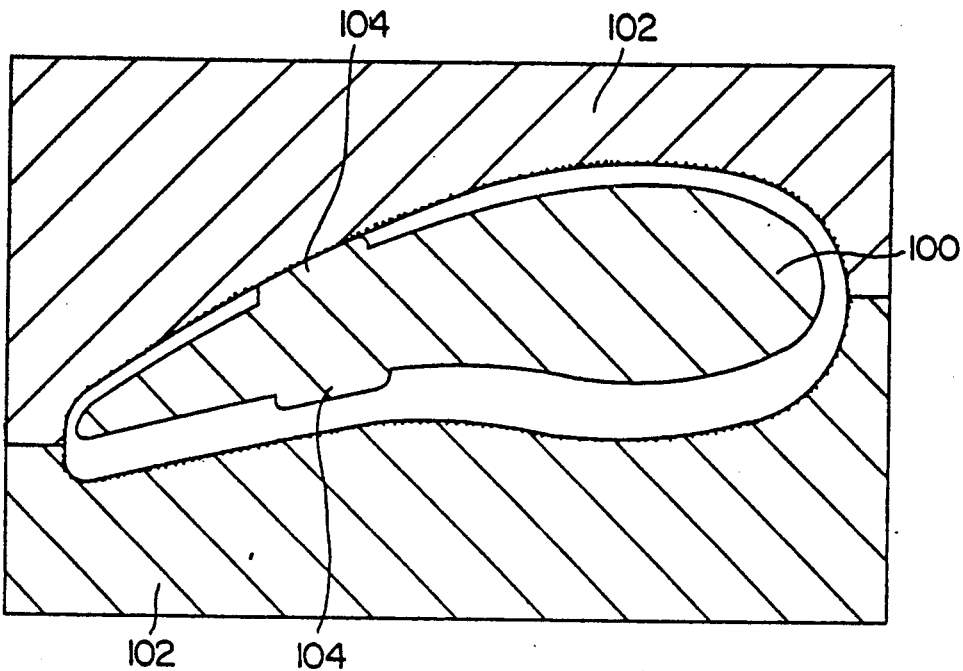
FIG. 11 is a cross-sectional end view of the tool and workpiece during the finishing operation schematically illustrated in FIG. 10.

The process of this invention, however, is ideally suited to the machining of such a repaired turbine blade, as schematically illustrated in FIG. 10. As generally shown in FIG. 10, and more specifically illustrated in FIG. 11, the partially repaired turbine blade (100) is made the workpiece, while tool (102) is made an orbital chemical milling machining tool as taught herein. Pursuant to the above description, the strongly passivating chemical milling fluid will passivate the entire surface of the turbine blade workpiece, including the new filled metal (104). In this application, however, the orbiting tool (102) will contact only the protruding filled metal (104), and accordingly, only that protruding filled metal (104) will be chemical milling machined pursuant to the principles described above. The original turbine blade material, already having a contour as desired, will remain passivated throughout the entire operation, and will thus retain its original desired contour. In this application, however, where the contacting orbital motion of the tool (102) does not orbitally move away from the filler metal (104), it will be necessary to provide an oscillating, reciprocal movement between the tool (102) and the filler metal (104) for the purpose of increasing the circulation of chemical milling fluid between the tool and workpiece. In this embodiment, the reciprocal motion will serve the added purpose of abrading both sides of the turbine blade where material (104) is on both sides of the blade as shown in FIG. 11.

In addition to repairing defective turbine blades having filler metal therein, the above described process can also be utilized to correct the contour of turbine blades, or any other such metal part which may be defective by virtue of the fact that the contour is not as exact as desired. Utilizing an application as illustrated in FIG. 11, the process of this invention can be utilized to abrade any high spots on the metal workpiece surface.

Figure 12:
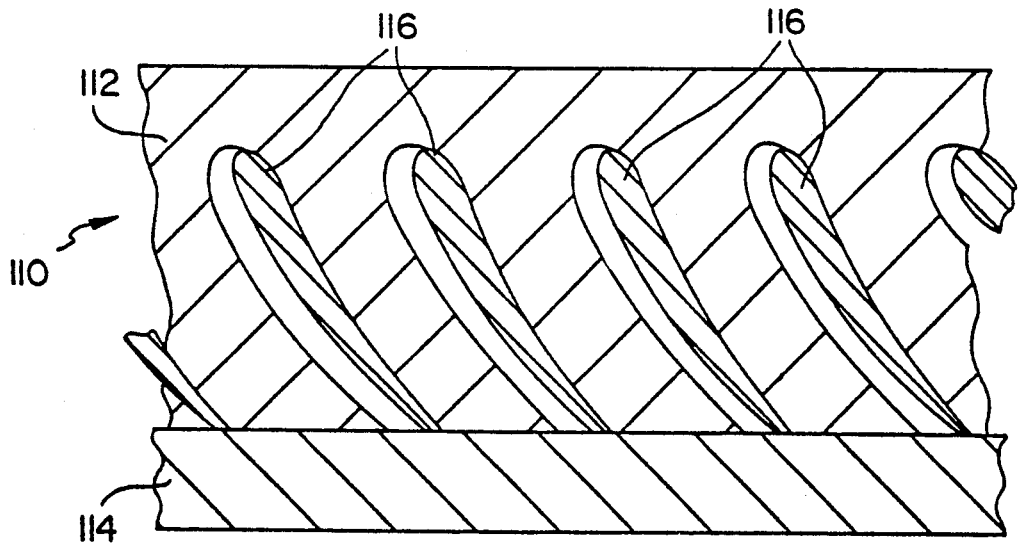
FIG. 12 is a schematic isometric view of a tool as placed on a turbine wheel to machining all of the turbine blades in a given circle of the turbine wheel.

Of significantly more importance, however, is the fact that the process of this invention can be utilized to simultaneously machine a group of turbine blades including a whole circle of turbine blades already affixed to a turbine wheel, whether mechanically attached thereto or formed as a one piece turbine wheel. As previously noted, the machining of the one piece turbine wheel has proven to be a very difficult operation. As schematically shown in FIG. 12, however, all the turbine blades on a turbine wheel can be machined simultaneously in an embodiment as shown, where the tool (110) comprises an upper portion (112) and lower portion (114), fitted together over a plurality of turbine blades (116). Utilizing the same principle as described above for abrading a single turbine blade, the plurality of turbine blades (114) can be abraded and machined simultaneously to effect exacting dimensions and contour to each of the turbine blades in one single operation.

In operation, the chemical milling fluid should be selected which is strongly passivating to the workpiece metal, with the degree of passivation depending upon the nature of the machining to be performed; i.e., whether macro or micro controls are to be performed. In the embodiment illustrated in FIG. 1 for example, the passivating nature of the a chemical milling fluid serves only to effect a macro control of the chemical milling machining action, that is to completely prevent machining on certain selected surfaces. Therefore, the rate of passivation is not of any particular significance during the machining operation.

It should be noted that passivation is dependent upon many variables, namely, the chemical milling fluid itself, the workpiece metal, the chemical milling fluid pH, concentration and temperature, and flow rate. Therefore, it is not possible to define a given chemical milling fluid which will have suitable passivation characteristics for all applications.

In very general terms, when the workpiece is steel, a suitable chemical milling solution would be ferric chloride. When titanium is to be milled, hydrofluoric acid will be employed. Aluminum is ordinarily milled with sodium hydroxide. In equally general terms, the steps ordinarily taken and the auxiliary ingredients normally added to minimize passivation are to be avoided, contrary to the usual practice and expectations in the art.

At the same time it is also possible in many circumstances to eliminate the normal requirements of masking the surfaces of the workpiece in areas not be to be milled. The formation of the passivation layer will be sufficient to protect the surface conformation. The thin passivation layer may be removed when processing is complete if desired although in many circumstances it may be left in place.

In light of the avoidance of steps taken to prevent passivation, the overall rate of chemical action will often be more rapid in the present invention. In addition, the active physical removal of the passivation layer by the orbital grinding operation will accelerate the overall process.

Unless specifically desired and provided for, there will ordinarily be no undercutting formed by the procedure in the present invention.

What is claimed is:

1. A method of chemical milling a surface of a workpiece, the steps comprising:
   a. forming a tool comprising a body with a surface of abrasive particles complementary to the intended shape of said workpiece;
   b. mounting said workpiece and said tool in an oscillating relationship to each other such that said abrasive surface is opposed to a surface to be machined;
   c. introducing a chemical milling fluid between said tool and said workpiece;
   d. passivating said workpiece to form a passivation layer thereon;
   e. causing a relative contacting motion between said tool and said workpiece such that said abrasive particles on the surface of said tool will abrade said workpiece only on those areas of the workpiece where machining is to be performed and thereby selectively abrade away only selected portions of said passivation layer on said workpiece to expose fresh workpiece metal thereunder, thereby permitting a portion of said workpiece metal to be removed by chemical milling and reform said passivation layer;
   f. causing a relative reciprocal motion between said tool and said workpiece sufficient to pump said chemical milling fluid between said tool and said workpiece;
   g. causing an advancing motion between said tool and said workpiece while said workpiece metal is being removed so as to maintain contact between said tool and said workpiece.

2. A method of claim 1 wherein said contacting relative motion is an orbital motion.

3. A method according to claim 2 wherein said relative orbital motion is in a plane sufficiently different from said surface to be machined that said relative orbital motion also effects said reciprocal motion.

4. A method according to claim 2 wherein said relative orbital motion is in a plane corresponding to said surface to be machined so that said reciprocal motion is independent of, and in a plane different than, said relative orbital motion.

5. A method according to claim 2 in which the orbital linear displacement between said tool and said workpiece is less than about 0.100 inch.

6. A method according to claim 1 wherein said surface to be machined and said tool surface of abrasive particles include curved surfaces.

7. A method according to claim 1 wherein said workpiece has at least two surfaces to be machined and said tool has at least two surfaces having abrasive particles so that at least two corresponding surfaces of said workpiece are machined simultaneously.

8. A method according to claim 1 in which said workpiece is a turbine blade, and said tool has a form sufficient to fit around said turbine blade sufficient to machine multiple sides thereof.

9. A method according to claim 1 in which said workpiece is a turbine containing a plurality of turbine blades, and said tool has a form sufficient to fit around a plurality of said turbine blades and sufficient to machine multiple sides of said plurality of turbine blades.

10. A method according to claim 1 in which said orbital motion between said tool and said workpiece is from 10 to 12 feet per minute.

11. A method according to claim 1 in which said nonconductive abrasive particles have a grain size of less than 70 mesh.

12. A method of chemical milling a surface of a workpiece, the steps comprising:
    a. forming a tool comprising a body with a surface of abrasive particles complementary to the intended shape of said workpiece;
    b. mounting said workpiece and said tool in an oscillating relationship to each other such that said abrasive surface is opposed to said surface to be machined;
    c. introducing a chemical milling fluid between said tool and said workpiece;
    d. causing a relative contacting motion between said tool and said workpiece such that said abrasive particles on the surface of said tool will abrade away any passivation layer formed on said workpiece to expose fresh workpiece metal thereunder, thereby permitting said workpiece metal to be removed by chemical milling;
    e. causing a relative reciprocal motion between said tool and said workpiece sufficient to pump said chemical milling fluid between said tool and said workpiece to prevent over-heating thereof;
    f. causing an advancing motion between said tool and said workpiece while said workpiece metal is being removed so as to maintain contact between said tool and said workpiece during each abrading step.

13. A method of claim 12 wherein said relative contacting relative motion is an orbital motion.

14. A method according to claim 13 wherein said relative orbital motion is in a plane sufficiently different from said surface to be machined that said relative orbital motion also effects said reciprocal motion.

15. A method according to claim 13 wherein said relative orbital motion is in a plane corresponding to said surface to be machined and said reciprocal motion is independent of, and in a plane different than, said relative orbital motion.

16. A method according to claim 13 in which the orbital linear displacement between said tool and said workpiece is less than about 0.100 inch.

17. A method according to claim 12 wherein said surface to be machined and said tool surface of nonconductive abrasive particles have at least one curved surface.

18. A method according to claim 12 wherein said workpiece has at least two surfaces to be machined and said tool has at least two surfaces having abrasive particles so that all surfaces of said workpiece are machined simultaneously.

19. A method according to claim 12 in which said workpiece is a turbine blade, and said tool has a form sufficient to fit around said turbine blade sufficient to machine multiple sides thereof.

20. A method according to claim 12 in which said workpiece is a turbine containing a plurality of turbine blades, and said tool has a form sufficient to fit around a plurality of said turbine blades and sufficient to machine multiple sides of said plurality of turbine blades.

21. A method according to claim 12 in which said orbital motion between said tool and said workpiece is from 10 to 12 feet per minute.

22. A method according to claim 12 in which said abrasive particles have a grain size of less than 70 mesh.

23. A method of machining a surface of a workpiece, the steps comprising:
    a. forming a tool comprising a body with a surface of abrasive particles complementary to the intended shape of said workpiece;
    b. mounting said workpiece and said tool in an oscillating relationship to each other such that said abrasive surface is opposed to said surface to be machined;
    c. introducing an a chemical milling fluid between said tool and said workpiece which is passivating to said workpiece to form a passivation layer thereon;
    d. causing a relative orbital motion between said tool and said workpiece in a plane sufficiently different from said surface to be machined such that said relative orbital motion effects a relative reciprocal motion between said tool and said workpiece, sufficient to pump said chemical milling fluid between said tool and said workpiece to prevent over-heating thereof, said orbital motion causing said abrasive particles on the surface of said tool to abrade said workpiece only on those areas of the workpiece where machining is to be performed and thereby selectively abrade away only selected portions of said passivation layer on said workpiece to expose fresh workpiece metal thereunder, thereby permitting a portion of said workpiece metal to be removed by an chemical action of the chemical milling fluid; and
    e. causing an advancing motion between said tool and said workpiece while said workpiece metal is being removed so as to maintain contact between said tool and said workpiece.

24. A method according to claim 23 wherein said relative orbital motion is in a plane corresponding to said surface to be machined so that said reciprocal motion is independent of, and in a plane different than, said relative orbital motion.

25. A method according to claim 23 in which the orbital linear displacement between said tool and said workpiece is below about 0.100 inch.

26. A method according to claim 23 wherein said surface to be machined and said tool surface of abrasive particles have at least one curved surface.

27. A method according to claim 23 wherein said workpiece has at least two surfaces to be machined and said tool has at least two surfaces having abrasive particles so that all surfaces of said workpiece are machined simultaneously.

28. A method according to claim 23 in which said workpiece is a turbine blade, and said tool has a form sufficient to fit around said turbine blade sufficient to machine multiple sides thereof.

29. A method according to claim 23 in which said workpiece is a turbine containing a plurality of turbine blades, and said tool has a form sufficient to fit around a plurality of said turbine blades and sufficient to machine multiple sides of said plurality of turbine blades.

30. A method according to claim 23 in which said orbital motion between said tool and said workpiece is from 10 to 12 feet per minute.

31. A method according to claim 23 in which said abrasive particles have a grain size of less than 70 mesh.

32. A method of chemical milling a surface of a workpiece, the steps comprising:
   a. forming a tool comprising a body with a surface of abrasive particles complementary to the intended shape of said workpiece;
   b. mounting said workpiece and said tool in an oscillating relationship to each other such that said abrasive surface is opposed to said workpiece;
   c. introducing a chemical milling fluid between said tool and said workpiece;
   d. causing a relative orbital motion between said tool and said workpiece in a plane sufficiently different from said surface to be machined such that said relative orbital motion effects a relative reciprocal motion between said tool and said workpiece sufficient to pump said chemical milling fluid between said tool and said workpiece, said orbital motion causing said abrasive particles on the surface of said tool to abrade away any passivation layer formed on said workpiece to expose fresh workpiece metal thereunder, thereby permitting said workpiece metal to be removed by; and
   e. causing an advancing motion between said tool and said workpiece while said workpiece metal is being removed so as to maintain contact between said tool and said workpiece during each abrading step.

33. A method according to claim 32 wherein said relative orbital motion is in a plane corresponding to said surface to be machined and said reciprocal motion is independent of, and in a plane different than, said relative orbital motion.

34. A method according to claim 32 in which the orbital linear displacement between said tool and said workpiece is below about 0.100 inch.

35. A method according to claim 32 wherein said surface to be machined and said tool surface of abrasive particles have curved surfaces.

36. A method according to claim 32 wherein said workpiece has at least two surfaces to be machined and said tool has at least two surfaces having abrasive particles so that all surfaces of said workpiece are machined simultaneously.

37. A method according to claim 32 in which said workpiece is a turbine blade, and said tool has a form sufficient to fit around said turbine blade sufficient to machine multiple sides thereof.

38. A method according to claim 32 in which said workpiece is a turbine containing a plurality of turbine blades, and said tool has a form sufficient to fit around a plurality of said turbine blades and sufficient to machine multiple sides of said plurality of turbine blades.

39. A method according to claim 32 in which said orbital motion between said tool and said workpiece is from 10 to 12 feet per minute.

40. A method according to claim 32 in which said abrasive particles have a grain size of less than 70 mesh.

* * * * *